(12) United States Patent
Fox et al.

(10) Patent No.: US 8,375,011 B2
(45) Date of Patent: Feb. 12, 2013

(54) SAFE MULTI-STREAM VERSIONING IN A METADATA REPOSITORY

(75) Inventors: Joshua Fox, Jerusalem (IL); Benny Halberstadt, Jerusalem (IL); Boris Melamed, Jerusalem (IL); Erel Sharf, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 11/834,428

(22) Filed: Aug. 6, 2007

(65) Prior Publication Data

US 2009/0043800 A1 Feb. 12, 2009

(51) Int. Cl.
*G06F 17/30* (2006.01)
(52) U.S. Cl. ...................................................... 707/695
(58) Field of Classification Search .......... 707/100–102, 707/200, 201, 203, 695
See application file for complete search history.

(56) References Cited

U.S. PATENT DOCUMENTS

| | | | |
|---|---|---|---|
| 6,460,052 B1 | 10/2002 | Thomas et al. | |
| 6,735,593 B1* | 5/2004 | Williams | 707/102 |
| 7,243,089 B2* | 7/2007 | Becker-Szendy et al. | 707/1 |
| 7,275,063 B2* | 9/2007 | Horn | 707/102 |
| 2003/0115223 A1* | 6/2003 | Scott et al. | 707/203 |
| 2004/0177319 A1* | 9/2004 | Horn | 715/501.1 |
| 2005/0114291 A1* | 5/2005 | Becker-Szendy et al. | 707/1 |
| 2005/0131964 A1 | 6/2005 | Saxena | |

* cited by examiner

*Primary Examiner* — Amresh Singh
(74) *Attorney, Agent, or Firm* — Sawyer Law Group, P.C.

(57) ABSTRACT

Managing metadata in a metadata repository that includes parsing metadata to determine an identity of the metadata and individual items associated with the metadata. Converting the identity of the metadata and the individual items associated with the metadata into corresponding object structures. Storing the object structure representing the identity of the metadata into a first table of the metadata repository and storing the object structures that represent the individual items associated with the metadata into a second table of the metadata repository. Responsive to receiving a request to modify a row in the first table or a row in the second table, logically deleting the row being modified without actually deleting or modifying the row, and creating a new row within the first table or the second table having the modified row, in which the new row further includes a link to the logically deleted row.

4 Claims, 3 Drawing Sheets

SAFE MULTI-STREAM VERSIONING IN A METADATA REPOSITORY

FIELD OF THE INVENTION

The present invention relates generally to data processing, and more particularly to techniques for managing data in a data store (e.g., a metadata repository).

BACKGROUND OF THE INVENTION

A metadata repository is a database of data about data (metadata). One purpose of a metadata repository is to provide a consistent and reliable means of access to data. A metadata repository can be stored in a physical location or may be a virtual database, in which metadata is drawn from separate sources. Metadata may include, for example, information about how to access specific data, or more detail about data.

The set of items stored within a metadata repository typically changes over time—e.g., items can be deleted, added, and modified. Such changes over time can cause one or more of the following problems: 1) it may be impossible to review older items for auditing—which is essential for anti-fraud investigations, Sarbanes-Oxley, and the like; 2) it may be impossible to review the timeline of a given item as the item is added, changed, and deleted—often essential for time-series analytics; 3) if quality problems emerge, it may be impossible to roll back with confidence to a known good state; and 4) if two or more users (User A and User B) change replicated copies if an item in parallel, a common historical baseline of the item is essential for merging algorithms, which generally compare a state of the item in the copy of User A, the item in the copy of User B, and the common historical baseline of the item.

Conventional metadata repositories typically store large chunks of structured metadata as opaque strings, blobs (binary large objects), or clobs (character large objects). For example, the repository might store units such as an entire XML Schema Definition (XSD) or Web Service Description Language (WSDL) file as a string, an entire ERWin file (.ER1 file) as a blob, or an entire Java file as a string. Storing time-safe histories of these requires replicating large blobs/clobs. However, this requires excessive storage and processing overhead. Moreover, it may be impossible to truly track the changes over time on a fine-grained level—e.g., which XSD complexType underwent a name change in a given XSD Schema.

Another technique used in conventional metadata repositories (and common to some Source Code Control Systems) is to track deltas—i.e., the units of text that have changed—between versions. Yet the deltas lack context within metadata structure. For example, a delta might specify that an element declaration was added to line 55 of an XSD, yet the delta cannot indicate that the element was moved from complexType "Person" to complexType "Address". Yet another technique used in conventional metadata repositories is to log an action that changed an item, for example "element declaration "street" was deleted in CustomerFormat.xsd. But when the metadata is analyzed, users are typically interested in the state of the metadata, and not in the step-by-step chain of actions. The purpose of this patent is to solve these problems.

BRIEF SUMMARY OF THE INVENTION

In general, this specification describes a method for managing metadata in a metadata repository. The method includes parsing metadata to determine an identity of the metadata and to determine individual items associated with the metadata; converting the identity of the metadata into an object structure representing the identity of the metadata and converting each of the individual items associated with the metadata into corresponding object structures that represent the individual items associated with the metadata; storing the object structure representing the identity of the metadata into a first table associated with the metadata repository and storing the object structures that represent the individual items associated with the metadata into a second table associated with the metadata repository; and responsive to receiving a request to modify a row in the first table or a row in the second table, logically deleting the row being modified without actually deleting or modifying the row, and creating a new row within the first table or the second table having the modified row, in which the new row further includes a link to the logically deleted row.

Implementations can include one or more of the following features. Logically deleting a row being modified can include tagging the row as being retired. The link to the logically deleted row can be expressed by relational foreign key/primary key references. The storage of the metadata can be entirely contained within the first table and the second table. The individual items associated with the metadata can include one or more of integers, strings, Booleans, floating point numbers, or references to other metadata items.

Implementations may provide one or more of the following advantages. The invention allows fine-grained time-safe auditing of the state of the metadata repository at all past points in time; allows a view of a the timeline of changes on a fine grained basis, aiding in time-series analytics or simple historical tracing; allows rollback to a guaranteed good state; and allows multiple users to work on their own sandbox copies of the metadata repository or a portion thereof, to change these in parallel without risk of interference with other users and then to merge their work into the common repository.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The present invention relates generally to data processing, and more particularly to techniques for managing data in a data store (e.g., a metadata repository). The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figures 1, 3:
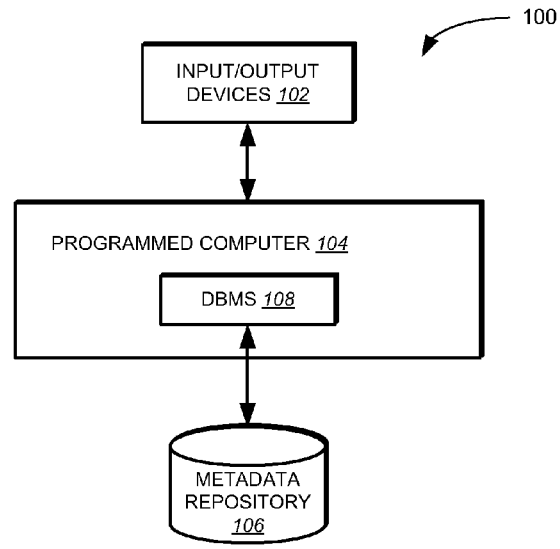
FIG. 1 is a block diagram of a data processing system including a metadata repository.
FIG. 3 illustrates example tables within the metadata repository of FIG. 1.

FIG. 1 illustrates a data processing system 100 in accordance with one implementation of the invention. The data processing system 100 includes input and output devices 102, a programmed computer 104, and a metadata repository 106. The input and output devices 102 can include devices such as a printer, a keyboard, a mouse, a digitizing pen, a display, a printer, and the like. The programmed computer 104 can be any type of computer system, including for example, a workstation, a desktop computer, a laptop computer, a personal digital assistant (PDA), a cell phone, a network, and so on. In one implementation, the metadata repository 106 is coupled to a database management system (DBMS) 108 running on the programmed computer 104. The database management system 108 can be a relational database management system (e.g., DB2 available from International Business Machines Corporation of Armonk, N.Y.), and the metadata repository 106 can be a relational database.

In general, the metadata repository 106 is configured to store metadata. The metadata can comprise structured metadata—e.g., XSD XML Schemas, WSDL (Web Service Description Language) Files, Relational database schemas, ERWin Entity relational models, Rational XDE Unified Modeling Languages Files, OWL ontology XML files, RDF/S (Resource Description Language Schemas). In one implementation, metadata is stored as an object structure using only a minimal number of tables—e.g., two tables—within the metadata repository 106. The metadata repository 106 permits fine-grained metadata storage (as described in greater detail below), which differs from conventional techniques that stores large units of metadata as strings or blobs. In one implementation, fine-grained storage means that each entry in the database is atomic—i.e., each entry includes only one scalar data item or one reference (foreign key).

Figure 2:
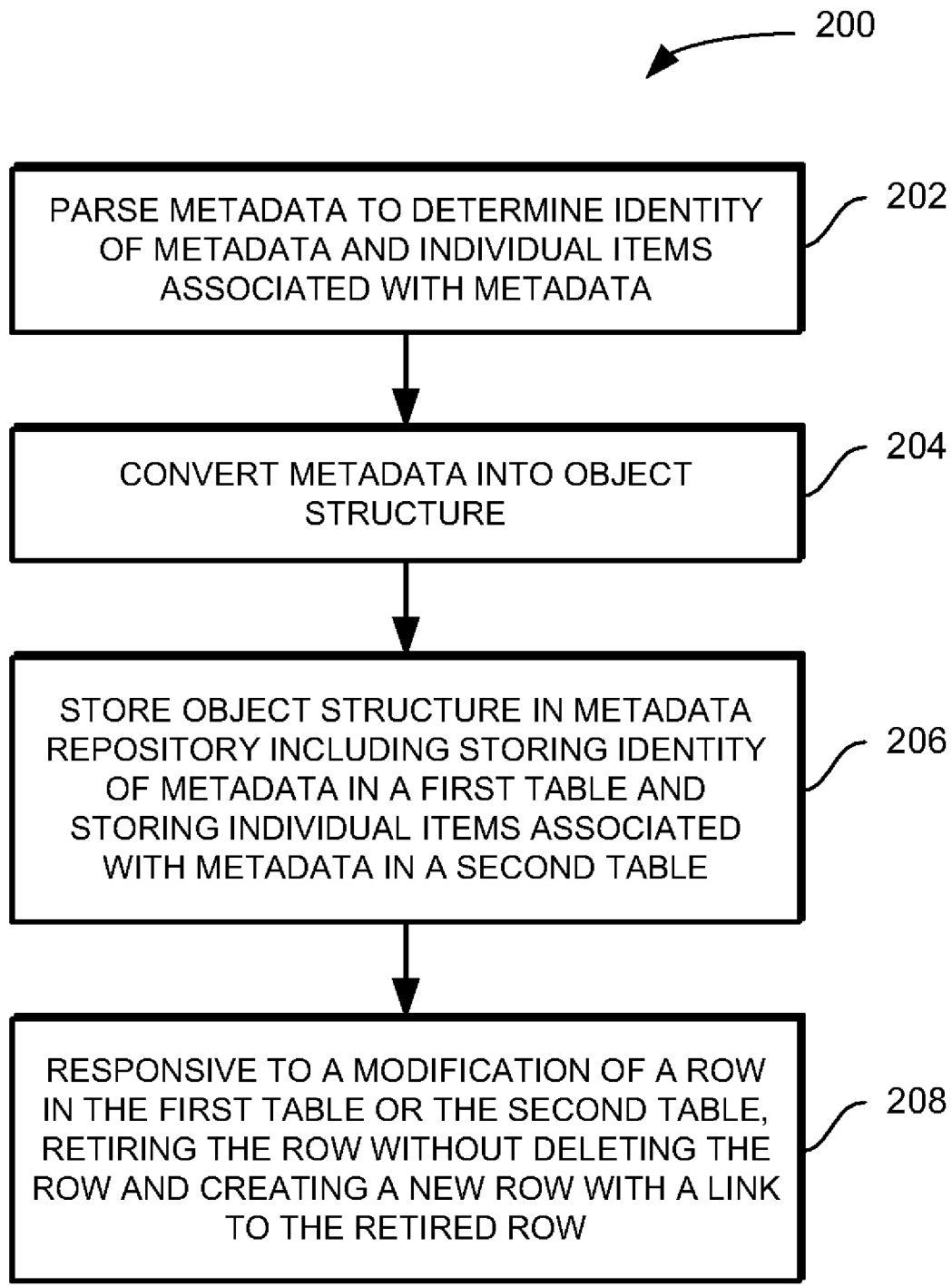
FIG. 2 illustrates a method for managing data in a metadata repository in accordance with one implementation.

FIG. 2 illustrates a method 200 for managing data in a metadata repository (e.g., metadata repository 106) in accordance with one implementation. Metadata is parsed to determine an identity of the metadata and to determine individual items associated with the metadata (step 202). The individual items associated with metadata can include any information which is a part of the metadata. For example, the individual items can be primitive data such as integers, strings, Booleans, floating point numbers, or references (links) to other metadata objects. The metadata is converted into an object structure (step 204). In one implementation, an object structure is represented through an object-oriented paradigm that is based on encapsulating code and data into a single unit. Conceptually, all interactions between an object and the rest of the system are via messages. In general, an object structure has associated with it: a set of variables that contain the data for the object (the value of each variable can be itself an object); a set of messages to which the object responds; and a set of methods, each of which is a body of code to implement each message (a method returns a value as the response to the message). In one implementation, the links that constitute an object structure are expressed by ordinary relational foreign key/primary key references.

The object structure is stored in the metadata repository within two tables (step 206). In one implementation, the identity of metadata objects is stored in the first database table and the individual items associated with the metadata are stored in the second database table. Responsive to a modification of a row in the first table or the second table, the row being modified is tagged as "retired" without (actually) deleting or modifying the row, and a new row is created (having the modified item) with a link to the retired row (step 208). Thus in one implementation, rows are not deleted in the metadata repository, but rather each row is tagged to indicate when the information in the row was "created" or "retired". In this implementation, if a change is made to a metadata object, the metadata object is tagged as retired (i.e., logically deleted) and a new metadata object is created, while preserving all links to other metadata objects. Thus, no information is ever lost, and (in one implementation) version numbers are used to reconstruct any past state.

For example, given the following metadata that includes a database schema which tells of a TABLE PERSON, COLUMN FIRSTNAME, COLUMN LASTNAME, such metadata is converted into an object structure of three metadata objects, and linked into a graph as follows:

```
TABLE PERSON(1)
   -- ------> COLUMN FIRSTNAME(2)
      \-----> COLUMN LASTNAME(3)
```

FIG. 3 illustrates one implementation of the two tables within a metadata repository—i.e., a metadata objects table 300 and an items table 302—corresponding to the example above. As shown in FIG. 3, the metadata objects table 300 includes three rows, for metadata objects 1, 2, and 3 respectively. The items table 302 includes the following rows: "PERSON" as the name of metadata object 1, "FIRSTNAME" as the name of metadata object 2, and "LASTNAME" for metadata object 3. In one implementation, there is an ordinary relational reference from this row back to metadata object 1. There is also a column stating that this item is the name of metadata object 1. The items table 302 further includes a row holding a link item, i.e., stating that metadata object 2 is linked to metadata object 1. The items table 302 also includes a column stating that this link item indicates the parent of metadata object 2 (i.e., the parent table of column LASTNAME is table PERSON. In addition, the items table 302 includes rows for the link from metadata object 3 to metadata object 1; 1 to 2; and 2 to 3.

To trace versions (in one implementation), two integer version columns are added to each table in the metadata repository. These columns are CREATED_VERSION and RETIRED_VERSION, which declare the version in which a metadata object or item was created and retired. In one implementation, the version number is maintained globally in within the metadata repository; and every transaction increments the version number by one. In one implementation, if an item is still "active", the RETIRED_VERSION has a dummy marker value (e.g., −1) to indicate such.

Accordingly, rows are not deleted in the metadata repository. In one implementation, the logical deletion of a metadata object or item is done by noting the version number at the point in which the metadata object or item is tagged to be retired. Modifications to metadata objects or items are performed by "retiring" the row associated with the metadata object or item being modified, and a new row is added to the corresponding table including the modified metadata object or item, and all relevant relational references (or links) are added to the new row.

When a user wants to work with metadata off-line, the user can receive (in his local replicated system) a copy of the metadata with an indication of the version at which the metadata was copied. The version numbers associated with the user's copy of the metadata increments in accordance with usage while the user is working off-line. When the user wants to merge changes back in, a merge algorithm has full information available—i.e., the exact state when the metadata was copied) available in the original central metadata repository); the end-state in the central repository after changes have been placed there by other users; and the end-state of the user's off-line copy of the metadata. (These three types of state information would not be available in conventional systems that incorporate techniques of versioning in which some information can be overwritten and deleted.) Following the merge, (in one implementation) the metadata receives a version number corresponding to the latest global number in the central repository plus one. The implementation also supports a second suitable editing mode in which a user does not make an off-line copy but rather directly edits the central repository can be used.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 4:
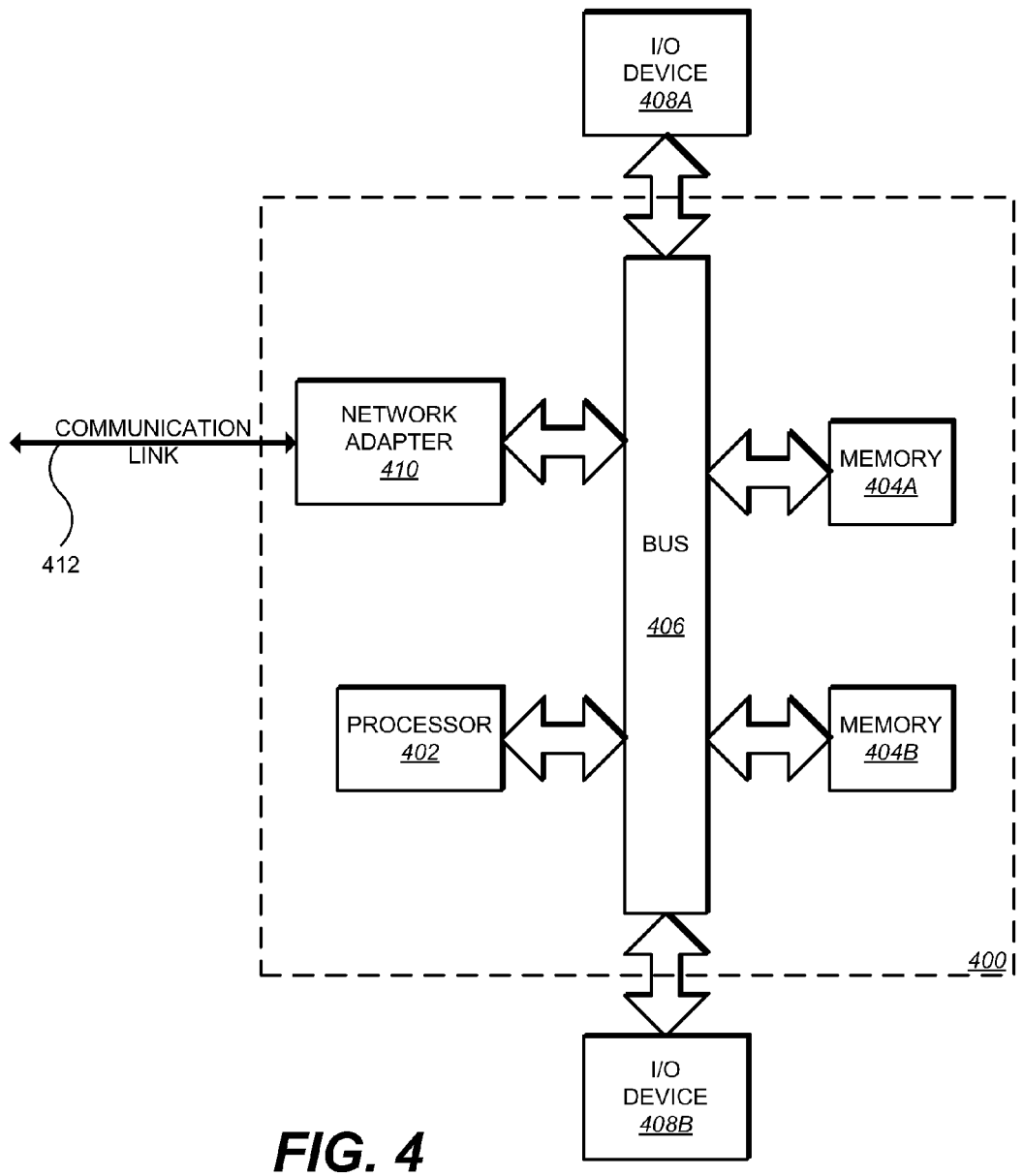
FIG. 4 is a block diagram of a data processing system suitable for storing and/or executing program code in accordance with one implementation of the invention.

FIG. 4 illustrates a data processing system 400 suitable for storing and/or executing program code. Data processing system 400 includes a processor 402 coupled to memory elements 404A-B through a system bus 406. In other implementations, data processing system 400 may include more than one processor and each processor may be coupled directly or indirectly to one or more memory elements through a system bus. Memory elements 404A-B can include local memory employed during actual execution of the program code, bulk storage, and cache memories that provide temporary storage of at least some program code in order to reduce the number of times the code must be retrieved from bulk storage during execution. As shown, input/output or I/O devices 408A-B (including, but not limited to, keyboards, displays, pointing devices, etc.) are coupled to data processing system 400. I/O devices 408A-B may be coupled to data processing system 400 directly or indirectly through intervening I/O controllers (not shown).

In one implementation, a network adapter 410 is coupled to data processing system 400 to enable data processing system 400 to become coupled to other data processing systems or remote printers or storage devices through communication link 412. Communication link 412 can be a private or public network. Modems, cable modems, and Ethernet cards are just a few of the currently available types of network adapters.

Various implementations for managing data in a metadata repository have been described. Nevertheless, various modifications may be made to the implementations. For example, though the techniques described above refer to a metadata repository, the techniques are applicable to other types of data stores that store items which change over time. In addition, steps of the methods described above can be performed in a different order and still achieve desirable results. Accordingly, many modifications may be made without departing from the scope of the following claims.

What is claimed is:

1. A method for managing metadata in a metadata repository, the method comprising:
   parsing metadata to determine an identity of the metadata and to determine individual items associated with the metadata;
   converting the identity of the metadata into an object structure representing the identity of the metadata and converting each of the individual items associated with the metadata into corresponding object structures that represent the individual items associated with the metadata;
   storing the object structure representing the identity of the metadata into a first table associated with the metadata repository and storing the object structures that represent the individual items associated with the metadata into a second table associated with the metadata repository, wherein both the first table and the second table include a created version number column and a retired version number column; and
   responsive to receiving a request to modify a row in the first table or a row in the second table, logically deleting the row being modified without actually deleting or modifying the row by updating the retired version number column of the row being modified with a retired version number corresponding to a current version number of the metadata repository, and creating a new row within the first table or the second table having the modified row, wherein the new row includes a link to the logically deleted row, wherein the new row further includes a created version number corresponding to the current version number of the metadata repository within its created version number column.

2. The method of claim 1, wherein the metadata repository consists of only the first table and the second table.

3. The method of claim 2, wherein the individual items associated with the metadata includes one or more of integers, strings, Booleans, floating point numbers, or references to other metadata objects.

4. A computer program product stored on a non-transitory computer-readable medium, the non-transitory computer-readable medium being encoded with a computer program for managing metadata in a metadata repository, wherein the computer program, when executed on a computer, causes the computer to:
   parse metadata to determine an identity of the metadata and to determine individual items associated with the metadata;
   convert the identity of the metadata into an object structure representing the identity of the metadata and converting each of the individual items associated with the metadata into corresponding object structures that represent the individual items associated with the metadata;
   store the object structure representing the identity of the metadata into a first table associated with the metadata repository and storing the object structures that represent the individual items associated with the metadata into a second table associated with the metadata repository, wherein both the first table and the second table include a created version number column and a retired version number column; and responsive to receiving a request to modify a row in the first table or a row in the second table, logically delete the row being modified without actually deleting or modifying the row by updating the retired version number column of the row being modified with a retired version number corresponding to a current version number of the metadata repository, and creating a new row within the first table or the second table having the modified row, wherein the new row includes a link to the logically deleted row, wherein the new row further includes a created version number corresponding to the current version number of the metadata repository within its created version number column.

* * * * *